United States Patent [19]
Pavlak

[11] Patent Number: 5,223,710
[45] Date of Patent: Jun. 29, 1993

[54] OPTICAL ANGULAR POSITION SENSING SYSTEM FOR USE WITH A GALVANOMETER

[75] Inventor: Raymond Pavlak, Shrewsbury, Mass.

[73] Assignee: Digital Equipment Corporation, Maynard, Mass.

[21] Appl. No.: 847,463

[22] Filed: Mar. 6, 1992

[51] Int. Cl.$^5$ .............................. G01D 5/30; G01J 1/32
[52] U.S. Cl. ..................................... 250/230; 250/205
[58] Field of Search ............... 250/230, 235, 234, 236, 250/201.1, 205, 231.13; 359/221, 214; 346/108, 109

[56] References Cited

U.S. PATENT DOCUMENTS

| | | | |
|---|---|---|---|
| 4,024,545 | 5/1977 | Dowling et al. | 359/221 |
| 4,152,588 | 5/1979 | Klatt et al. | 250/230 |
| 4,544,241 | 10/1985 | LaBudde et al. | 359/214 |
| 4,621,351 | 11/1986 | Baer et al. | |
| 4,630,276 | 12/1986 | Moran | |
| 4,687,920 | 8/1987 | van der Linden | 250/230 |
| 4,714,339 | 12/1987 | Lau et al. | |
| 4,721,860 | 1/1988 | Troendle | 250/568 |
| 4,792,931 | 12/1988 | Nishida et al. | 250/230 |
| 4,797,868 | 1/1989 | Ando | |
| 4,813,032 | 5/1989 | Koyama | |
| 4,840,483 | 6/1989 | Haffner | |
| 4,926,403 | 5/1990 | Tsuyuguchi et al. | |
| 4,972,344 | 11/1990 | Stoddard et al. | 369/44.11 |
| 4,987,293 | 1/1991 | Baciak | |
| 5,107,365 | 4/1992 | Ota | 359/221 |
| 5,136,159 | 8/1992 | Nakazawa et al. | 250/230 |

FOREIGN PATENT DOCUMENTS

0448362A2  9/1991  European Pat. Off. ............ 250/230

OTHER PUBLICATIONS

J. Torkel Wallmark, "A New Semiconductor Photocell Using Lateral Photoeffect", Proc. IRE, pp. 474-483, Oct. 1956.

G. P. Petersson and L. Lindholm, "Position Sensitive Light Detectors with High Linearity", IEEE Journal of Solid-State Circuits, vol. SC13, No. 3, pp. 392-399, Jun. 1978.

W. R. Gonnason, J. W. Haslett, and F. N., Trofimenkoff, "A Low Cost High Resolution Optical Position Sensor", IEEE Transactions on Instrumentation and Measurement, vol. 39, No. 4, pp. 653-663, Aug. 1990.

Primary Examiner—David C. Nelms
Assistant Examiner—Michael Messinger
Attorney, Agent, or Firm—Cesari and McKenna

[57] ABSTRACT

An optical angular position sensing system determines the angular position of a primary, beam-directing mirror by sensing the position of a beam from a secondary light source reflected from a secondary mirror on the back surface of the primary mirror. The position sensing system includes a photodetector that produces two output currents, the difference of which represents both the position of the reflected secondary beam and the intensity of the light source. A second servo-loop dynamically normalizes the output of the sensor by controlling the intensity of the light source to stabilize the total output of the sensor. The light source is oriented relative to the secondary mirror such that the mirror reflects a long dimension of a cross-section of the beam in a direction which is perpendicular to the direction of beam movement. The beam thus overlaps the transverse dimension of the photodetector so that maintenance of a predetermined light flux on the photodetector does not require precise placement of the light source or the sensor. To provide a low mass mirror, the primary mirror is formed on a silicon substrate and the secondary mirror is formed by adding a reflective coating to the back surface of the substrate. Forming the mirrors on two surfaces of the substrate also eliminates position errors related to differences in the relative positions of the two mirrors.

11 Claims, 1 Drawing Sheet

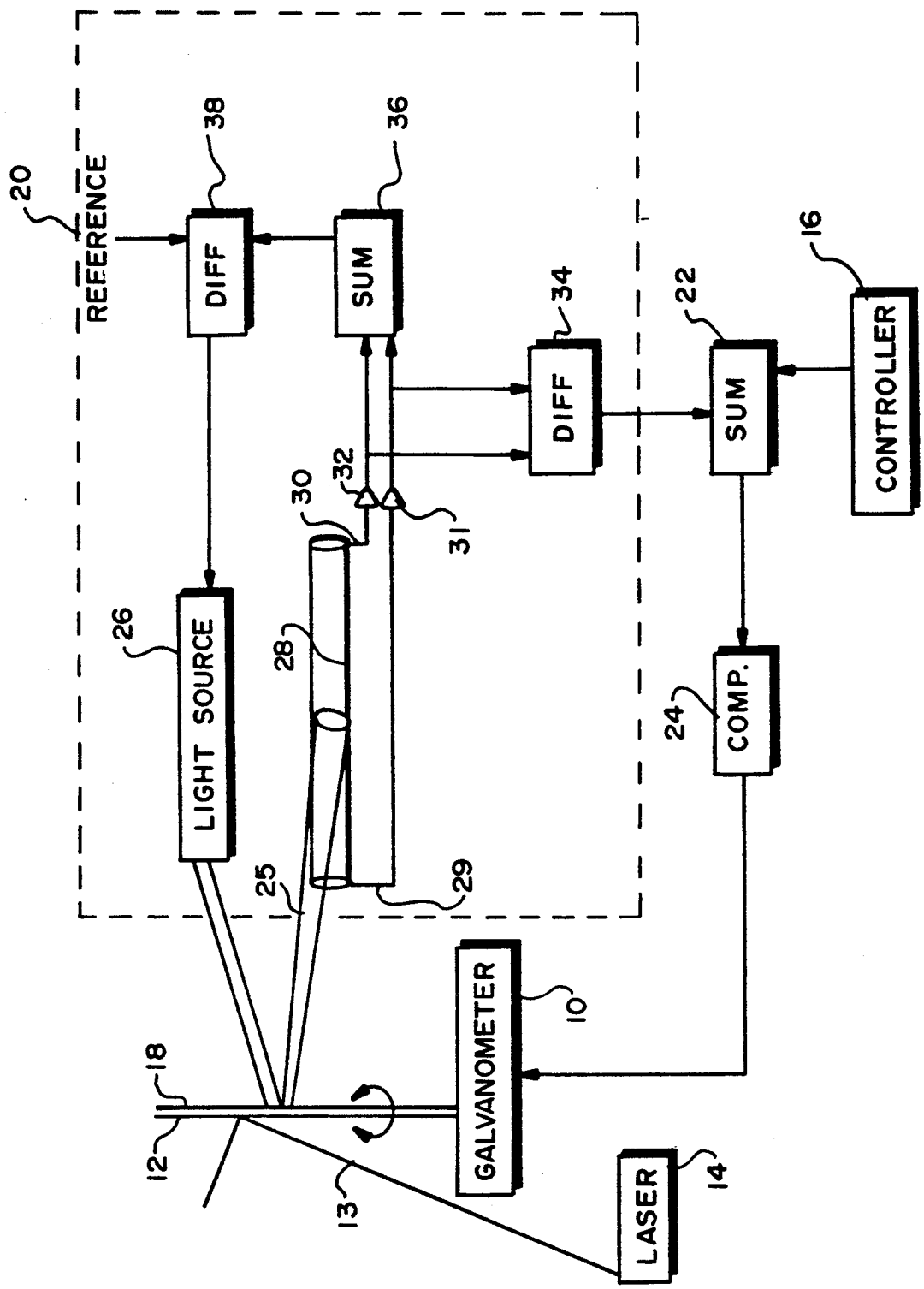

OPTICAL ANGULAR POSITION SENSING SYSTEM FOR USE WITH A GALVANOMETER

FIELD OF INVENTION

The invention relates generally to galvanometers and more particularly to galvanometers which rotate mirrors to direct light beams.

BACKGROUND

Galvanometers are often used to rotate mirrors to direct light beams to desired positions. Such arrangements are used, for example, to record information on light-sensitive surfaces. In the application of interest here, the mirrors are used to position light beams on data tracks of optical disk drives and a magneto-optical disk system using a galvanometer-rotated mirror is described in the co-pending U.S. Pat. application of Lee, et. al., entitled Optical Storage System identified as U.S. Patent and Trademark Office Ser. No. 07/847,116.

In the latter system the galvanometer is connected in a servo-loop that receives a command to move the mirror to a desired angular position. A position sensor provides a signal which indicates the mirror position and this signal is compared with the desired position to provide an error signal that drives the galvanometer to the latter position.

SUMMARY

A galvanometer-mirror combination incorporating the invention includes an optical position sensor which determines the position of the mirror by sensing the position of a beam from a secondary light source reflected from a secondary mirror on the back surface of the primary, beam-directing mirror. The position sensor includes a photodetector that produces two output currents, and the difference of the currents represents both the position of the reflected secondary beam and the intensity of the light source. A second servo-loop controls the intensity of the light source to stabilize the total output of the optical sensor. This second servo-loop thus dynamically normalizes the output of the sensor.

Preferably the secondary light source produces a beam with a relatively narrow, elongated cross-section. The light source is oriented such that the mirror reflects the long dimension of the beam cross-section in a direction which is perpendicular to the direction of beam movement. The beam thus overlaps the transverse dimension of the photodetector so that maintenance of a predetermined light flux on the photodetector does not require precise placement of the secondary light source or the sensor. A laser diode, emitting a relatively narrow beam having an elliptical cross-section, provides the desired beam characteristic without the use of focusing or collimating optics.

In a preferred embodiment, the primary mirror is formed on a silicon substrate to provide a low mass for fast positioning of the mirror. The secondary mirror is formed by adding a reflective coating to the back surface of the substrate.

Moreover, silicon attenuates any light which passes through surface defects in the reflective coatings that form the mirrors. It thus enhances isolation of the position sensor from the beam directed by the primary mirror.

To further attenuate the interference from the transmitted light, the optical position sensor may be coated with an optical filter which preferentially passes the wavelength of the light from the secondary light source and reflects other wavelengths. Baffles may also be employed to shield the sensor from stray light.

BRIEF DESCRIPTION OF THE DRAWINGS

The above and further advantages of the invention may be better understood by referring to the following description in conjunction with the accompanying drawing which schematically depicts a galvanometer and a servo-loop for controlling the angular position of the galvanometer in accordance with the invention.

DETAILED DESCRIPTION

The FIGURE depicts a system 8 that includes a galvanometer 10 which positions a primary mirror 12 to direct a beam 13 from laser 14 to a desired location. A controller 16 directs the galvanometer to rotate the mirror 12 to an angular position in which the mirror reflects the beam 13 to the desired location.

Specifically, the controller 16 supplies to a summing circuit 22 a position command. The summing circuit 22 sums the position command with a position signal, from a position sensor 20, which represents the position of the mirror 12. The summing circuit thus produces an error signal which represents the difference between the commanded position and the position of the mirror. The summing circuit 22 supplies the error signal to an amplifier and compensation circuit 24 whose output drives the galvanometer 10.

The optical position sensor 20, discussed in more detail below, responds to the position of a beam 25 which it receives from a light source 26 by way of a secondary mirror 18. The mirror 18 is preferably formed on the back surface of the mirror 12 by adding a reflective coating to that surface. The mirror 18 thus rotates with the mirror 12 so that the position of the beam 25 on a photodiode 28 corresponds with the angular position of the mirror 12.

More specifically the photodiode 28 is preferably a lateral effect photodiode. In response to the received light, the photodiode 28 produces on lines 29 and 30, respectively, two currents which relate to the position of the beam 25. The photodiode 28 acts essentially as a current divider and produces currents whose difference varies as the beam moves toward one end or the other of the photodiode.

Amplifiers 31 and 32 convert the photodiode currents to voltages and supply these voltages to a difference circuit 34. The difference circuit produces a difference signal which represents the position of the beam 25 on the diode 28. The difference signal, in turn, is provided to the summing circuit 22.

A lateral effect photodiode produces output currents which are a function of the total light flux, as well as the position of the beam. The photodiode currents, and thus, the position-related current difference, are therefore affected by changes in the light flux o the diode. Prior sensors have included dividers which normalize the current difference by dividing it by the sum of the currents, to produce a current difference which is independent of changes in light flux.

The optical position sensor 20 does not include a divider. Instead, it includes a servo-loop which dynamically normalizes the output of the sensor 20 by controlling the intensity of the light source to produce on the photodiode 28 a light flux that produces a predetermined sum of the output currents. This servo-loop includes a summing circuit 36, which effectively adds the currents produced by the photodiode on lines 29 and 30, and a difference circuit 38 that subtracts the sum from a reference representing the predetermined total current. The resulting error signal is used to adjust the intensity control of the light source 26 to produce a light beam 25 which will provide that current. A conventional compensation circuit (not shown) may be included in the loop, as necessary.

This arrangement compensates for variations in the intensity of the light source 26, as well as variations in the sensitivity of the photodiode 28. Furthermore, the output of the position sensor 20 becomes increasingly non-linear as the light beam moves from the center of the diode. In stabilizing the sum of the photodiode outputs, the servo loop reduces this nonlinearity and thereby extends the effective range of the position sensor.

To provide this feature, the servo-loop which controls the intensity of the light source should operate relatively fast, so that the lag between beam movement and light source intensity correction is minimal. The speed with which the servo-loop performs the correction increases its ability to reduce the random optical noise output of the light source.

Position-sensing photodiodes are commonly used with focused beams. In such a system, the light source, a focusing or collimating lens and the photodiode must be carefully positioned to center the focused beam on the photodiode. The system 8 uses a light source, such as a light emitting diode or a semiconductor laser, which produces a narrow beam with an elliptical cross-section. This eliminates the need for a lens.

Moreover, the light source 26 is oriented, relative to the mirror 18, such that the major axis of the beam cross section is perpendicular to the direction of beam movement, as shown in the drawing. The photodiode 28 produces currents which represent the position of the "centroid" of the beam, which is essentially the position of the minor axis of the beam cross section. The major axis of the beam cross-section extends beyond the edges of the photodiode. Accordingly, with lateral displacement of the beam, it will still extend the full width of the photodiode. Over the range of this overlap, the illumination of the photodiode therefore will not vary appreciably as a function of the relative transverse positions of the light source 25 and photodiode 28. These parts therefore need not be precisely positioned and the system 8 can be assembled at relatively low cost. In this connection it should be noted that with large variations of photodiode illumination due to position variations, a substantial part of the range of the illumination-control servo control loop would be used to eliminate such variations, thereby reducing the effective range of the loop for compensation of other variations.

The mirror 18 is preferably attached to the rear-surface of the substrate of the mirror 12. Preferably, the mirror 18 is formed on that surface by applying a reflective coating. The mass of the two mirrors is thus minimized.

The mass of the mirror 12, and thus, the mirror 18, is further minimized by constructing the mirrors out of silicon instead of glass. Silicon is not only light-weight, it materially attenuates light which may be transmitted through surface defects in the mirrors. The silicon thus helps isolate the two optical systems from each other.

To further minimize the effect of leakage of light from the primary optical system, optical filters may be used to preferentially transmit to the photodiode 28 the wavelengths of the light source 26 and reflect the wavelengths of the laser 14. The filters work particularly well if the wavelengths of the beam 25 produced by the light source 26 is widely separated from the wavelength of the beam 13. Baffles (not shown) may also be employed to deflect stray light from the sensor 20.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A system for positioning a rotating mirror to direct light to a desired location, the system including:
   A. an optical position sensor for producing currents associated with the position of a received light beam;
   B. a light source for producing an uncollimated light beam, the light source having a controllable intensity adjustment;
   C. a reflecting mirror for reflecting the light beam from the light source to the optical position sensor, the reflecting mirror moving with the rotating mirror;
   D. a controller for producing a commanded position signal which relates to a position to which the rotating mirror must be move to direct light to the desired location;
   E. a beam position difference circuit for receiving the currents produced by the optical position sensor and taking the difference of the currents to producing beam position difference;
   F. a summing circuit for summing the beam position difference and the commanded position signal to produce a position error signal;
   G. a galvanometer for rotating he rotating mirror in accordance with the position error signal.

2. The system of claim 1, wherein the system further includes a difference circuit for taking the difference of the current sum and a reference value to produce an intensity error signal and applying the intensity error signal to the light source as an intensity adjustment, the light source altering the intensity of the light beam.

3. The system of claim 1, wherein the reflecting mirror is formed on a rear surface of the rotating mirror.

4. The system of claim 1, wherein the mirrors are constructed of silicon.

5. The system of claim 1, wherein the light source produces a beam with an elliptical cross section and the light source is positioned relative to the reflecting mirror such that the mirror reflects a major axis of the elliptical cross section in a direction perpendicular with a direction of beam movement.

6. The system of claim 1, wherein the optical position sensor is a later effect photodiode.

7. The system of claim 1, wherein the optical position sensor further includes optical filters for filtering light transmitted by the rotating mirror.

8. A system for directing a light beam to a desired location, the system including:
   A. a rotating mirror;
   B. a reflecting mirror for reflecting a beam from a secondary light source to the optical position sensor, the reflecting mirror moving with the rotating mirror;
C. a light source for producing an uncollimated, elliptically shaped beam, the light source providing the beam to the reflecting mirror;
D. an optical position sensor for determining the position of the mirror by determining the relative position of the beam reflected from the reflecting mirror;
E. position difference means for producing an error signal representing a difference between the position of the rotating mirror and a position from which the rotating mirror directs the light beam to the desired location; and
F. a galvanometer for moving the rotating mirror in accordance with the error signal.

9. The system of claim 8, wherein the optical position sensor is a lateral effect photodiode which produces two currents related to the relative position of the beam reflected from the reflecting mirror.

10. The system of claim 9, wherein the system further includes:
G. means for controlling the intensity adjustment of the light source such that a sum of the currents produced by the photodiode in response to a reflection of the light beam is a predetermined value; and
H. difference means for determining the difference of the currents produced by the optical position sensor, the difference means applying the difference to the position difference means as a signal associated with the position of the rotating mirror.

11. The system of claim 10, wherein the reflecting mirror is formed on a rear surface of the rotating mirror.

* * * * *